(12) United States Patent
Hein

(10) Patent No.: US 6,256,049 B1
(45) Date of Patent: Jul. 3, 2001

(54) MEMORY MANAGEMENT METHOD FOR ENTERING DATA INTO AND READING DATA OUT OF A MEMORY DEVICE

(75) Inventor: Sören Hein, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 08/964,702

(22) Filed: Nov. 5, 1997

Related U.S. Application Data

(63) Continuation of application No. PCT/DE96/00741, filed on Apr. 29, 1996.

(30) Foreign Application Priority Data

May 5, 1995 (DE) .............................................. 195 16 667

(51) Int. Cl.[7] .................................................. G09G 5/36
(52) U.S. Cl. ................................... 345/509; 345/521
(58) Field of Search .......................... 345/507–511, 515, 345/521

(56) References Cited

U.S. PATENT DOCUMENTS

| | | | |
|---|---|---|---|
| 5,513,301 | * 4/1996 | Wakasu | 395/114 |
| 5,543,824 | * 8/1996 | Priem et al. | 345/508 |
| 5,584,032 | * 12/1996 | Hyatt | 711/100 |
| 5,587,726 | * 12/1996 | Moffat | 345/508 |
| 5,748,539 | * 5/1998 | Sproull et al. | 365/189.04 |

FOREIGN PATENT DOCUMENTS

| | | |
|---|---|---|
| 35 33 163 C2 | 3/1986 | (DE) . |
| 0 070 465 A1 | 1/1983 | (EP) . |
| 2 252 465 | 8/1992 | (GB) . |

OTHER PUBLICATIONS

"Quickersort", Bsort– a friendly sorting method, Uwe Thiemann, Sorting Know–How, pp. 264–267.

\* cited by examiner

*Primary Examiner*—Kee M. Tung
(74) *Attorney, Agent, or Firm*—Herbert L. Lerner; Laurence A. Greenberg; Werner H. Stemer

(57) ABSTRACT

A memory management method for entering data into and reading data out of a storage device enters data into the storage device in such a way that in the process the data last read out from the storage device are in each case overwritten by the data to be entered. The method makes it possible for a converting unit for converting sequentially fed image data into a sequence suitable for carrying out an interlacing method to operate with a memory having a storage capacity that is reduced to a minimum.

9 Claims, 1 Drawing Sheet

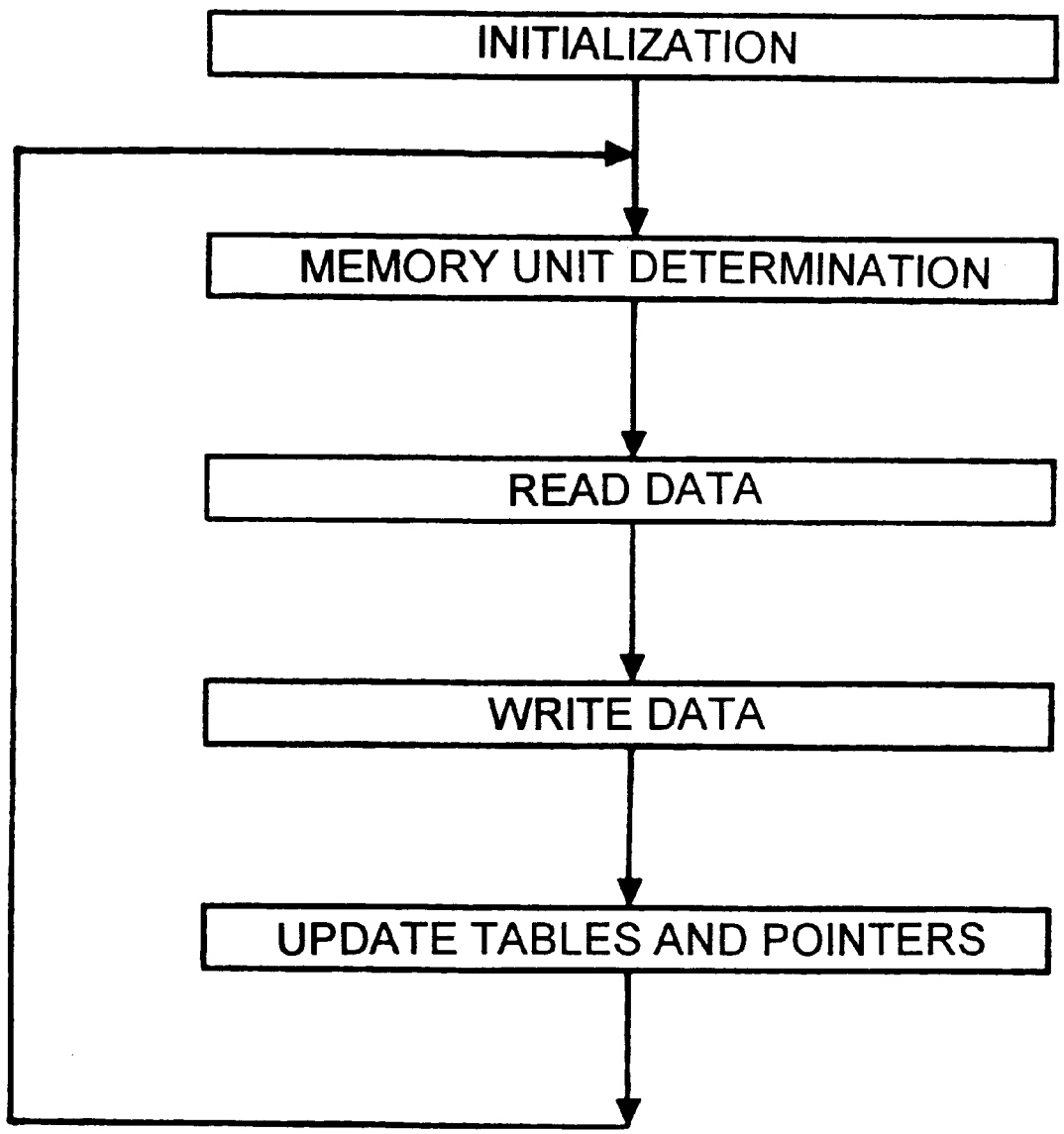

MEMORY MANAGEMENT METHOD FOR ENTERING DATA INTO AND READING DATA OUT OF A MEMORY DEVICE

CROSS-REFERENCE TO RELATED APPLICATION

This application is a continuation of International Application Serial No. PCT/DE96/00741, filed Apr. 29, 1996.

BACKGROUND OF THE INVENTION

Field of the Invention

The present invention relates to a memory management method for entering data into and reading data out of a memory device having a plurality of memory regions.

Such a method for entering data into and reading data out of a storage device can be applied wherever storage devices are used to store data.

However, the use of such advantageously operating methods is particularly important where it is a regular requirement to enter and read out large data volumes.

That is the case, for example, in image processing systems and video systems, etc., specifically and in particular when an image data output unit outputs image data to be displayed on an image display unit such as, for example, video data, in a sequence other than that which has to be delivered to the image display unit for normal display.

That is the case, for example, when the image data output unit sequentially outputs all of the data of an image to be displayed, whereas the image display unit requires the data in a sequence suitable for carrying out an interlacing method.

An MPEG-2 video decoder system according to ISO/IEC standard 13818-2 may be mentioned as a concrete possibility for the use of an advantageously operating memory management method for entering data into and reading data out of a memory device having a plurality of memory regions.

A converting unit must be provided for the purpose of converting the data output by an image data output unit into a sequence suitable for carrying out the interlacing method.

For the purpose of better understanding the structure and function of known converting units, and for the purpose of better understanding the method for operating such converting units according to the invention, an examination will firstly be made of some initial conditions which will be assumed in the following discussion.

It is assumed that the image data output unit outputs image data such as, for example, video data of one line in each case in regular time intervals, with a sequence of output lines proceeding strictly sequentially from an upper end to a lower end of the image to be displayed and therefore not corresponding to a sequence suitable for the interlacing method.

It is further assumed that the image display unit is to be fed the data to be displayed in a sequence suitable for the interlacing method, with the lines to be displayed having to be fed at the same time intervals as lines are output by the image data output unit.

When a sequence suitable for the interlacing method is mentioned, the sequence which is understood is that in which the group of all even lines of an image and the group of all odd lines of the image are transmitted not interlaced with one another but in a temporal sequence. In that process, the group of the even lines yields a first field, and the group of the odd lines yields a second field, with each of the fields naturally including only half of the lines output by the image data output unit per image to be displayed. The frame to be finally output by the image data output unit is obtained on the image display unit by superimposing the associated fields. Two fields are displayed per frame on the image display unit. If the frame frequency is, for example, 25 Hz, the field frequency is 50 Hz.

The simplest known structure of a converting unit for converting the data output by the image data output unit into data suitable for the image display unit includes two digital memories, each of which has a storage capacity that is sufficient to store the data of a complete image to be displayed, that is to say to store the data of a frame.

That converting unit is operated in such a way that the data which are output instantaneously by the image data output unit and are required for displaying the next image are entered into one of the memories, while at the same time the field data to be provided for the image about to be displayed are read out in the appropriate sequence from the other memory.

If such a method is used to represent a frame according to the PAL standard, each of the two digital memories to be provided must have a storage capacity of 4.75 Mbit. Such large storage capacities entail high costs and large devices.

SUMMARY OF THE INVENTION

It is accordingly an object of the invention to provide a memory management method, which overcomes the hereinafore-mentioned disadvantages of the heretofore-known methods of this general type in such a way that a converting unit makes do with a memory having a relatively low storage capacity.

With the foregoing and other objects in view there is provided, in accordance with the invention, a memory management method for entering data into and reading data out of a memory device having a plurality of memory regions, which comprises entering data into a memory device and reading data out of the memory device in alternating memory regions of the memory device; and entering the data by writing in a memory region from which data has immediately previously been read out.

Due to the fact that the data last read out are automatically overwritten immediately after being read out by data which are to be newly entered into the storage device, the storage capacity of the storage device is always optimally used, because in this way the storage device is at no time blocked by data which have already been collected and are therefore no longer required.

A method has thus been created which renders it possible to use a converting unit having a relatively low storage capacity.

The reading out of stored data and entering of new data are performed respectively in alternation, that is to say the fact that in the type of memory management according to the invention it is already possible to start reading out the data before an associated total volume of data to be entered into the storage device has been fully stored, means that further processing or displaying of the data can already be started relatively early.

The fact that successive read and write accesses are respectively performed on one and the same memory area further has the effect of a reduced outlay in setting up the respective read and write addresses.

In accordance with another mode of the invention, there is provided a memory management method which comprises entering the data into the memory device in the form of data read out of an image data output unit representing an image to be displayed on an image display unit.

In accordance with a further mode of the invention, there is provided a memory management method which comprises reading out the data stored in the memory device for displaying an image represented by the data on an image display unit.

In accordance with an added mode of the invention, there is provided a memory management method which comprises entering the data in an inscription operation and reading out the data in a readout operation in the form of data representing one line of an image to be shown on an image display unit.

In accordance with an additional mode of the invention, there is provided a memory management method which comprises writing in and reading out the data in the form of video data.

In accordance with yet another mode of the invention, there is provided a memory management method which comprises writing in and reading out the data in the form of video data containing chrominance data and luminance data.

In accordance with a concomitant mode of the invention, there is provided a memory management method which comprises displaying the image on a monitor operating according to an interlacing method as the image display unit.

Other features which are considered as characteristic for the invention are set forth in the appended claims.

Although the invention is illustrated and described herein as embodied in a memory management method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The FIGURE of the drawing is a flowchart of a memory management method according to the invention.

DESCRIPTION OF THE PREFERRED EMBODIMENTS

Referring now to the invention in detail, it is noted that the memory management method according to the invention which is described below serves to convert data, in particular video data, that have been output by an image data output unit, into a sequence suitable for carrying out an interlacing method.

Although the present invention is described with reference to this entirely concrete application, it is nevertheless not restricted thereto, but can also be used wherever the same or similar data conversions are necessary.

A data converting unit for carrying out the method according to the invention can make do with only a single storage device (preferably in the form of a digital memory), in contrast with the converting unit described at the outset. This storage device needs to have a storage capacity of only a half frame.

In the following description, it will be assumed for reasons of clarity that the aim is to represent a frame including 16 lines, using the interlacing method, on an image display unit such as a monitor or the like. That is to say, in the present exemplary embodiment the converting unit has a memory with a storage capacity for data of 8 lines.

If a memory area in which the data of a line are stored is designated as a memory unit, the memory has eight memory units.

Such a low storage capacity is rendered possible by the memory management method according to the invention which is described below.

At a start of a run of this memory management method, the data of the first eight lines of the frame to be represented are entered into the memory of the converting unit, specifically the data of the zeroth line is entered into a zeroth memory unit, the data of the first line are entered into the first memory unit, the data of the second line are entered into the second memory unit, the data of the third line are entered into the third memory unit, the data of the fourth line are entered into the fourth memory unit, the data of the fifth line are entered into the fifth memory unit, the data of the sixth line are entered into the sixth memory unit, and the data of the seventh line are entered into the seventh memory unit.

After this has been concluded, a start is made on reading out the stored data. However, the entering of new data is also continued in parallel therewith.

Operations occurring in the process are explained with the aid of the following Table 1.

TABLE 1

|     | M0 | M1 | M2 | M3 | M4 | M5 | M6 | M7 |
|-----|-----|-----|-----|-----|-----|-----|-----|-----|
| T1  | R0/W8 | | | | | | | |
| T2  | | | R2/W9 | | | | | |
| T3  | | | | | R4/W10 | | | |
| T4  | | | | | | | R6/W11 | |
| T5  | R8/W12 | | | | | | | |
| T6  | | | | | R10/W13 | | | |
| T7  | R12/W14 | | | | | | | |
| T8  | R14/W15 | | | | | | | |
| T9  | | R1/W0 | | | | | | |
| T10 | | | | R3/W1 | | | | |
| T11 | | | | | | R5/W2 | | |
| T12 | | | | | | | | R7/W3 |
| T13 | | | R9/W4 | | | | | |
| T14 | | | | | | | R11/W5 | |
| T15 | | | | | | R13/W6 | | |
| T16 | R15/W7 | | | | | | | |

In the table, reference symbols M0, M1, . . . M7 denote memory units in which the first eight lines of the frame were entered at the beginning. Specifically, reference symbol M0 denotes the zeroth memory unit, M1 the first memory unit, M2 the second memory unit, M3 the third memory unit, M4 the fourth memory unit, M5 the fifth memory unit, M6 the sixth memory unit, and M7 the seventh memory unit.

Reference symbols T1, T2, . . . T16 denote instants at which operations specified in the corresponding lines are carried out on the memory units M0 to M7. The instants T1 to T16 are temporally successive instants.

Operations carried out at the respective instants T1 to T16 on the respective memory units M0 to M7 are denoted in Table 1 by reference symbols Rx and Wy, with reference symbol Rx indicating that the x-th line of a frame is read out, and reference symbol Wy indicating that the y-th line of a frame is entered.

Thus, for example, the entry R0/W8 in row T1, column M0 of Table 1 indicates that at the instant T1 the zeroth line of the frame is read out from the memory unit M0 and, immediately thereupon, the eighth line of the frame is entered into this memory unit M0.

The zeroth line of the frame can be read out from the memory unit M0 because, as is explained above, this line was entered there at the beginning. After being read out, this zeroth line is overwritten by the eighth line of the frame, because the eighth line is that line which is output at the instant T1 from the image data output unit (as already explained above, the lines 1 to 7 of the frame were already output at the beginning from the image data output unit and entered into the memory).

During the instants T2 to T4, the memory unit M0 contains the data of the eighth line of the frame.

At the instant T5, the eighth line of the frame is read out from the memory unit M0 and the data are overwritten by the data of the twelfth line of the frame.

A perusal of the temporal sequence of the read and write operations in Table 1 reveals that these are staggered in time in such a way that at a respective instant T1. . . T16 only one read-out operation and one entry operation are respectively performed.

A consideration of the numbers of the lines of the frame in Table 1 which are read at successive instants reveals that at the instants T1 to T8 all of the even lines (lines 0, 2, 4, 6, 8, 10, 12 and 14) of the frame are read out in rising sequence from the memory, while at the instants T9 to T16 all of the odd lines (lines 1, 3, 5, 7, 9, 11, 13 and 15) of the frame are read out in rising sequence from the memory.

During the instants T1 to T8, the reading out of the first field is thus performed, whereas during the instants T9 to T16 the reading out of the second field is performed.

With the reading out of the data of a line, or directly thereafter, the data read are overwritten with new data of a line to be displayed later.

A perusal of the numbers of the lines entered at successive instants in Table 1 reveals that at successive instants immediately successive lines of the frame to be displayed are entered into the storage device, and when the last line of a frame has been written into the storage device, the next step is to enter the first line of the next frame to be displayed.

On one hand, entering the data of a new line into a memory unit having data which were read out directly prior to this ensures that no data which are still required are overwritten by the entry operation.

On the other hand, the temporal sequential control of entering and reading out data from the storage device and the optimized size of the storage device ensure that the lines to be read out are always already stored therein despite the low storage capacity.

As a consequence of the way in which the data are written into and read out from the storage device according to the invention, there is a continuous variation in the assignment between the respective line numbers of the frame and the memory units in which the data of the relevant lines are stored or are to be entered.

This can be appreciated with the aid of Table 1: whereas the lines 0 to 7 of the frame were stored in the sequence 0, 1, 2, 3, 4, 5, 6 and 7 in the memory units M0 to M7 immediately before the instant T1, at the start of the next frame display cycle, that is to say immediately after the instant T16, the lines 0 to 7 of the next frame are stored in the memory units M0 to M7 in the sequence 7, 0, 4, 1, 6, 2, 5, 3.

A table is continuously managed and updated in order to render it possible to determine at any instant in which memory unit a line to be read out is stored.

Table 2, shown below, is such a table.

TABLE 2

|     | T0 | T1 | T2 | T3 | T4 | T5 | T6 | T7 | T8 | T9 | T10 | T11 | T12 | T13 | T14 | T15 | T16 |
| --- | --- | --- | --- | --- | --- | --- | --- | --- | --- | --- | --- | --- | --- | --- | --- | --- | --- |
| Z0  | M0 | —  | —  | —  | —  | —  | —  | —  | —  | M1 | M1  | M1  | M1  | M1  | M1  | M1  | M1  |
| Z1  | M1 | M1 | M1 | M1 | M1 | M1 | M1 | M1 | M1 | —  | M3  | M3  | M3  | M3  | M3  | M3  | M3  |
| Z2  | M2 | M2 | —  | —  | —  | —  | —  | —  | —  | —  | —   | M5  | M5  | M5  | M5  | M5  | M5  |
| Z3  | M3 | M3 | M3 | M3 | M3 | M3 | M3 | M3 | M3 | M3 | —   | —   | M7  | M7  | M7  | M7  | M7  |
| Z4  | M4 | M4 | M4 | —  | —  | —  | —  | —  | —  | —  | —   | —   | —   | M2  | M2  | M2  | M2  |
| Z5  | M5 | M5 | M5 | M5 | M5 | M5 | M5 | M5 | M5 | M5 | M5  | —   | —   | —   | M6  | M6  | M6  |
| Z6  | M6 | M6 | M6 | M6 | —  | —  | —  | —  | —  | —  | —   | —   | —   | —   | —   | M4  | M4  |
| Z7  | M7 | M7 | M7 | M7 | M7 | M7 | M7 | M7 | M7 | M7 | M7  | M7  | —   | —   | —   | —   | M0  |
| Z8  | —  | M0 | M0 | M0 | M0 | —  | —  | —  | —  | —  | —   | —   | —   | —   | —   | —   | —   |
| Z9  | —  | —  | M2 | M2 | M2 | M2 | M2 | M2 | M2 | M2 | M2  | M2  | M2  | —   | —   | —   | —   |
| Z10 | —  | —  | —  | M4 | M4 | M4 | —  | —  | —  | —  | —   | —   | —   | —   | —   | —   | —   |
| Z11 | —  | —  | —  | —  | M6 | M6 | M6 | M6 | M6 | M6 | M6  | M6  | M6  | M6  | —   | —   | —   |
| Z12 | —  | —  | —  | —  | —  | M0 | M0 | —  | —  | —  | —   | —   | —   | —   | —   | —   | —   |
| Z13 | —  | —  | —  | —  | —  | —  | M4 | M4 | M4 | M4 | M4  | M4  | M4  | M4  | M4  | —   | —   |
| Z14 | —  | —  | —  | —  | —  | —  | —  | M0 | —  | —  | —   | —   | —   | —   | —   | —   | —   |
| Z15 | —  | —  | —  | —  | —  | —  | —  | —  | M0 | M0 | M0  | M0  | M0  | M0  | M0  | M0  | —   |

The lines of a frame are denoted in Table 2 by reference symbols Z0, Z1, . . . Z15.

The memory units in which the respective lines of the frame are stored are denoted, as in Table 1, by reference symbols M0 to M7. The symbol "-" in Table 2 indicates that the relevant line has just been read out at the respective instant or is not stored at present in the storage device.

Reference symbols T0, T1, . . . , T16 in turn respectively denote successive instants. The respective instants correspond to the instants specified in Table 1, with the assignment specified in Table 2 between the line number of the frame and the memory unit in which the relevant line is stored corresponding to the state after the reading out and entering of data into the storage device, which are performed at the specified instant.

It can then be determined with the aid of Table 2 in which memory unit at a respective instant a specific line of the frame is stored, which is to be illustrated below with the aid of an example.

As may be seen from Table 2, at the instant T0 the lines 0 to 7 of the frame are stored in the memory units M0 to M7 (as already mentioned above, these lines were stored there at the beginning in this sequence).

As may be seen from Table 1 and as was explained when describing it, at the instant T1 the line 0 of the frame is read out from the memory unit M0, and the data read out are overwritten by the data of line 8 of the frame. This is indicated in Table 2 by the fact that a special sign, such as a "-", for example, occurs in the table row Z0 at the instant T1, which means that the data of the line 0 of the frame are no longer available in the storage device at the corresponding instant, and that the item "M0" occurs in the table row Z8 at the instant T1, which means that henceforward the data of the line 8 of the frame are stored in the memory unit M0.

All of the read-out and entry operations specified in Table 1 at the respective instants can be placed in Table 2.

At the instant T16, the lines 0 to 7 of the frame (to be represented next) are stored in the memory units M1, M3, M5, M7, M2, M6, M4 and M0. That is to say, in agreement with the representation in Table 1, the memory units M0 to M7 are occupied at the instant T16 with the lines 7, 0, 4, 1, 6, 2, 5, 3 in accordance with Table 2.

The table renders it possible to determine at any arbitrary instant the memory unit which is to be accessed for reading out and writing in.

The running of the method according to the invention will now be explained with the aid of the FIGURE.

According to the FIGURE, the method run starts with initialization. Various start conditions are laid down during the initialization phase. In detail, the following applications are carried out in this process:

n-th memory unit←n-th line of the frame
Table 2 [n]=n
write pointer=N
read pointer=0 with it being the case that n=0, 1, . . . , N−1 and that N is the number of lines per field.

The write pointer specifies the number of the row of the frame which is to be entered as the next one into the storage device.

The read pointer specifies the number of the line of the frame which is to be read out as the next one from the storage device.

The initialization is followed by the repeated alternating reading out of stored data from the storage device and overwriting of the read-out data by new data.

The steps of memory unit determination, reading from the memory, writing into the memory and updating of tables and pointers are carried out repeatedly for this purpose.

It is determined in the memory unit determination which memory unit is to be accessed when reading out and writing in data, in order to read out from the storage device the line of the frame stipulated by the read pointer. This respective access memory unit is yielded by the operation Access memory unit=Table 2 [read pointer]

When reading from the memory, those data which are stored in the previously determined memory unit are then read out. These are the data of that line of the frame which is stipulated by the read pointer.

In the writing into the memory, occurring subsequently thereto, the previously read-out data are overwritten by new data.

In the updating of tables and pointers, Table 2, the read pointer and the write pointer are updated. In detail, the following allocations are carried out in this process:

Table 2 [read pointer]=special sign such as,
for example, "-"
Table 2 [write pointer]=access memory unit
Read pointer=read pointer+2
if (read pointer=2N)
→read pointer=(read pointer+1) modulo 2N
if (read pointer>2N)
→read pointer=(read pointer−1) modulo 2N
read pointer=(read pointer+1) modulo 2N After the updating, the run merges again to the memory unit determination and repeats the latter and the steps following thereafter until the image display is to be terminated In a system in which the image data are present in the form of video data including chrominance information and luminance information, the memory management method according to the invention can be applied in principle both for the chrominance data and for the luminance data.

An exception occurs whenever, as partially provided, the chrominance information is provided only with half the vertical resolution of the luminance information. In this case, the same chrominance information must be available for both fields, with the result that the memory management method according to the invention cannot be used for the chrominance data, or can be used only in modified form.

Due to the fact that the memory management method according to the invention can continue to be used unchanged for the luminance data irrespective thereof, the storage capacity of the memory to be provided for the converting unit can itself in this case be reduced to a very low value (⅔ of the storage capacity required to store a frame).

The use of the method described above renders it possible for the converting unit for converting sequentially fed image data into a sequence suitable for carrying out the interlacing method to make do with a memory having a storage capacity which in each case is substantially smaller than the storage capacity required for storing a frame.

I claim:

1. A memory management method for entering data into and reading data out of a memory device having a plurality of memory regions, which comprises:

providing a memory with a plurality of memory regions;
reading data out of the memory from a first one of the plurality of memory regions;
before reading data out of the memory from any other one of the plurality of memory regions, writing data into the first one of the plurality of memory regions of the memory;
reading data out of the memory from a second one of the plurality of memory regions;

before reading data out of the memory from any other one of the plurality of memory regions, writing data into the second one of the plurality of memory regions of the memory;

reading data out of the memory from a third one of the plurality of memory regions; and before reading data out of the memory from any other one of the plurality of memory regions, writing data into the third one of the plurality of memory regions of the memory.

2. The memory management method according to claim 1, which comprises writing the data into the memory in the form of data read out of an image data output unit representing an image to be displayed on an image display unit.

3. The memory management method according to claim 2, which comprises displaying the image on a monitor operating according to an interlacing method as the image display unit.

4. The memory management method according to claim 1, which comprises reading out the data stored in the memory for displaying an image represented by the data on an image display unit.

5. The memory management method according to claim 4, which comprises displaying the image on a monitor operating according to an interlacing method as the image display unit.

6. The memory management method according to claim 1, which comprises writing the data in an inscription operation and reading out the data in a readout operation in the form of data representing one line of an image to be shown on an image display unit.

7. The memory management method according to claim 6, which comprises displaying the image on a monitor operating according to an interlacing method as the image display unit.

8. The memory management method according to claim 1, which comprises writing in and reading out the data in the form of video data.

9. The memory management method according to claim 1, which comprises writing in and reading out the data in the form of video data containing chrominance data and luminance data.

* * * * *